Patented Aug. 7, 1934

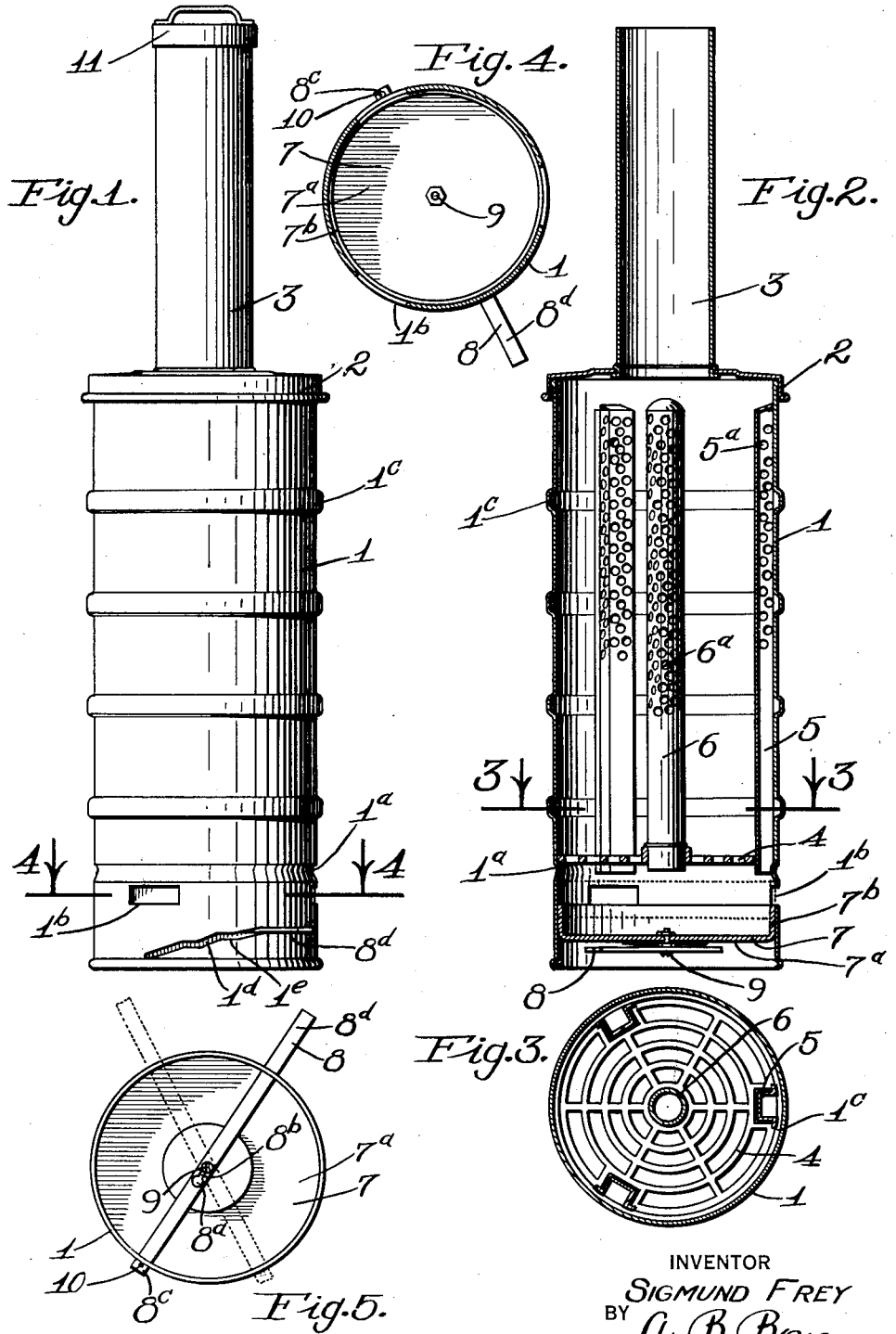

1,969,506

UNITED STATES PATENT OFFICE 1,969,506

ORCHARD HEATER

Sigmund Frey, Los Angeles, Calif.

Application April 27, 1931, Serial No. 533,139

9 Claims. (Cl. 126—59.5)

My invention relates to orchard heaters, and particularly to orchard heaters in which solid fuel is used, such as coke, coal, briquettes, and the like.

The objects of this invention are: first, to provide a very simple, economical and efficient orchard heater in which solid fuel is used; second, to provide an orchard heater of this class whereby the fire may be easily and quickly put out when desired without the loss of any fuel; third, to provide a heater of this class which may be easily and quickly relighted; fourth, to provide a heater of this class which will give its maximum heat after only a short period after being lighted; fifth, to provide a heater of this class having a removable stack and which is so constructed that the fuel will burn with a low flame until the stack is in position; sixth, to provide a heater of this class in which there are no vent holes in the enclosure between the grate and the upper end of the stack and which is provided with simple means below the grate and the upper end of the stack for closing both ends of the heater so that the fire may be easily and quickly put out; seventh, to provide novel and simple means for conducting air to the upper portion of the fire-box or above and to the burning fuel; eighth, to provide a heater of this class which may be effectively sealed at its lower end even though the heater is placed on uneven ground or foundation; ninth, to provide a novelly constructed combined bottom and air control gate for the heater; and, tenth, to provide a heater of this class which is durable and which will not readily deteriorate or get out of order.

With these and other objects in view, as will appear hereinafter, I have devised an orchard heater having certain novel features of construction, combination and arrangment of parts and portions, as will be hereinafter described in detail and particularly set forth in the appended claims, reference being had to the accompanying drawing and to the characters of reference thereon which form a part of this application in which:

Figure 1 is a side elevational view of my orchard heater in one form of construction with the vent holes and the stack sealed; Fig. 2 is a longitudinal sectional elevational view thereof showing the vent holes open and the stack uncovered; Fig. 3 is a transverse sectional view thereof taken through 3—3 of Fig. 2; Fig. 4 is a transverse sectional view thereof taken through 4—4 of Fig. 1; and, Fig. 5 is a bottom end view thereof, showing by dotted lines a shifted position of the air control gate.

Like characters of reference refer to similar parts and portions throughout the views of the drawing.

The main enclosure of the heater shown in the drawing consists of an upright cylindrical shell 1, a cover 2 removably mounted over the upper end of the shell 1, and a stack 3, of smaller diameter than the shell 1, secured to and extending upwardly from the cover 2. The diameter and height of the shell is determined by many factors and circumstances, such as convenience in handling, capacity of fuel to give heat a predetermined period, the obtaining of maximum rediation for the amount of heat generated, and other circumstances. I have found that a shell of from ten to twelve inches in diameter and a height of thirty inches, provides a very convenient and efficient size. Smaller sizes are however used in some localities.

Within the shell and spaced a considerable distance upwardly from its lower end, is a foraminous grate 4. This grate is supported at its periphery on a ledge formed by an inwardly extending annular bead $1a$. It will be noted that in the side wall of the shell between the grate and the upper end of the shell there are no vent holes, the only vent holes for the admission of air to aid combustion are provided in the side wall of the shell below the grate 4 and the bead $1a$, as indicated by $1b$. It has been found that in order to maintain a uniform fire or combustion of the fuel from the upper portion of the shell downwardly, air must be directed toward or in the vicinity of the upper layer of the fuel within the shell. Such air is usually admitted through holes in the side wall of the shell, but in my structure the air to the interior of the shell is admitted through a plurality of tubes 5 and 6 within the shell and which extend upwardly from the grate to near the upper end of the shell. These tubes may assume many forms, but the one here illustrated consists of rectangular channels 5 secured with the open sides of the channels against the inner sides of the wall of the shell, and a central tube 6 of cylindrical construction extending upwardly from the central portion of the grate. The tubes or channels 5 are positioned vertically and are uniformly spaced within the shell. The upper ends of the tubes 5 and 6 are preferably closed so that fuel is not discharged thereinto when filling the heater with fuel. In the side walls of the tubes 5 and 6 are provided relatively large vent holes $5a$ and $6a$, respectively, for admitting air to the shell from the space below the grate. These holes in the tubes extend a considerable distance downwardly from the upper ends of the tubes, and preferably the greater distance downwardly from the upper ends. The grate may be separate from the tubes 5 so that the grate may be easily removed, but the central tube 6 is preferably supported only by the grate and may be removed with the grate.

In the side walls of the shell are provided annular grooves 1c which are directed outwardly and are relatively wide. These grooves facilitate the directing of air laterally from the tubes 5. Thus air is admitted substantially around the whole outer wall of the shell but from the inner side thereof.

The means for controlling the draft or the admission of air through the vent holes 1b consists of a gate 7 and a handle 8. The gate 7 is of pan-like construction consisting of a plate portion 7a and an upwardly extending flange 7b at its periphery. This pan-like gate is vertically slidable within the lower portion of the shell 1 and is adapted, when raised, to cover wholly or in part the openings 1b. The flange 7b is adapted to engage the inner wall of the shell to prevent the tilting of the gate. The upper edge of the flange 7b is adapted, when the gate is raised, to engage tightly the lower portion of the bead 1a which lower portion is tapered upwardly and inwardly, for tightly sealing the joint between the gate and the shell. The plate or disc portion 7a of the gate forms a bottom of the shell and for the gate so as to exclude all air when the gate is raised into engagement with the bead 1a, as shown by dotted lines in Fig. 2. The vertical movement of the gate is controlled by the handle 8 which consists merely of a flat bar pivotally connected intermediate its ends to the central portion of the gate at the underside thereof and with the ends of the handle extending through helical slots 1d in the side wall of the shell below the plane of the openings 1b. The lower edge of the slots 1d may be provided with notches or ledges 1e for checking the movement of the handle, that is, to facilitate the holding of the handle in certain shifted positions.

The handle 8 may be provided with an enlarged hole 8a intermediate its ends for receiving the head of a screw 9 in the central portion of the gate 7 for readily connecting the handle with the gate. In the handle is provided a longitudinal slot 8b whereby the handle may be shifted lengthwise around the shank of the screw so that the handle is prevented from being disconnected readily from the gate. When the handle is so connected with respect to the gate, the end 8c of the handle, opposite the handle portion 8d, extends through the helical slots at the rear side of the heater. The handle is prevented from being removed from such position by a cotter pin or other key 10 extended through the end 8c of the handle. With this connection of the handle and the gate, the handle may be readily removed at any time so that the heaters may be readily stacked for shipping purposes or so that the bottom may be readily removed for dumping the ashes dropping through the grate.

For the upper end of the stack 3, I have provided a simple cover 11 which is placed over the upper end of the stack for sealing the upper end when desiring to put out the fire. When desiring to put out the fire, it will be noted, the handle 8 is shifted to its extreme counter clockwise position with the upper edge of the flange 7b of the gate in engagement with the bead 1a.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to recure by Letters Patent is:

1. In a heater, a shell having a grate at its lower portion and vent holes in its side wall below the grate, and a gate mounted below the grate, said gate being adapted to be raised with respect to the grate for closing the vent holes, said gate forming also a bottom for the shell for completely enclosing the lower end of the shell against the admission of air.

2. In a heater, a shell having a grate at its lower portion and vent holes in its side wall below the grate, a pan-like bottom for the shell below the grate, the bottom having an upwardly extending flange at its periphery for closing the vent holes when the bottom is shifted, and means for shifting the bottom with respect to the vent holes.

3. In a heater, a shell having a grate at its lower portion and vent holes in its side wall below the grate, a pan-like bottom for the shell below the grate, the bottom having an upwardly extending flange at its periphery for closing the vent holes when the bottom is shifted, and means for shifting the bottom with respect to the vent holes, the latter means holding the bottom in position and adapted to be readily removed for removing the bottom.

4. In a heater, a shell having a grate at its lower portion and vent holes in its side wall below the grate, a pan-like bottom for the shell below the grate, the bottom having an upwardly extending flange at its periphery for closing the vent holes when the bottom is raised, the side wall of the shell having diametrically opposed substantially helical slots below the plane of the vent holes, and a handle pivotally connected to the central portion of the bottom at the lower side thereof and extending through said slots for raising and lowering the bottom with respect to said vent holes.

5. In a heater, a shell having a grate at its lower portion and vent holes in its side wall below the grate, a pan-like bottom for the shell below the grate, the bottom having an upwardly extending flange at its periphery for closing the vent holes when the bottom is raised, the side wall of the shell having diametrically opposed substantially helical slots below the plane of the vent holes, and a handle pivotally connected to the central portion of the bottom at the lower side thereof and extending through said slots for raising and lowering the bottom with respect to said vent holes, there being provided in the shell, adjacent the slots, means for checking the free movement of the handle.

6. In a heater, a shell having a grate at its lower portion and vent holes in its side wall below the grate, a pan-like bottom for the shell below the grate, the bottom having an upwardly extending flange at its periphery for closing the vent holes when the bottom is raised, said shell being provided with a constricted portion above the bottom adapted to be engaged by the upper edge of the flange when the bottom is raised, for sealing the lower end of the shell against the admission of air.

7. In a heater, an upright shell having vent holes at its lower portion only, a bottom for the shell below the vent holes, a grate above the vent holes, air ducts extending from the grate to the upper portion of the shell and communicating at their lower ends with said vent holes and provided in the upper portions and considerably below the upper ends thereof with holes for admitting air to the upper portion of the shell, said bottom being adapted to be shifted for varying the size of the vent holes and for completely closing the same.

8. In a heater, an upright shell having vent holes at its lower portion only, a bottom for the shell below the vent holes, a grate above the vent holes, air ducts extending from the grate to the upper portion of the shell and communicating at their lower ends with said vent holes and provided in the upper portions and considerably below the upper ends thereof with holes for admitting air to the upper portion of the shell, said bottom being adapted to be shifted for varying the size of the vent holes and for completely closing the same, and means for completely closing the upper portion of the shell.

9. In a heater, an upright shell having a grate at its lower portion and vent holes in the side wall thereof below the grate, air conducting tubes extending from the space below the grate adjacent the side wall of the shell and upwardly toward the upper portion of the shell, the upper portions only of the tubes having holes, said shell having circumscribing grooves on the inside thereof substantially connecting said tubes at various portions intermediate the ends of the tubes.

SIGMUND FREY.